(12) United States Patent
Windte et al.

(10) Patent No.: US 6,331,772 B1
(45) Date of Patent: Dec. 18, 2001

(54) SENSOR COMPONENT

(75) Inventors: Volker Windte, Offenbach; Roland Fischer, Nidderau, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/308,693
(22) PCT Filed: Oct. 10, 1997
(86) PCT No.: PCT/EP97/05612
§ 371 Date: Jul. 21, 1999
§ 102(e) Date: Jul. 21, 1999
(87) PCT Pub. No.: WO98/23922
PCT Pub. Date: Jun. 4, 1998

(30) Foreign Application Priority Data

Nov. 22, 1996 (DE) ............................................. 196 48 335

(51) Int. Cl.$^7$ .................................................. G01B 7/14
(52) U.S. Cl. .............................. 324/207.24; 324/207.25; 324/207.15
(58) Field of Search ................. 324/207.24, 207.25, 324/207.18, 209, 207.15, 207.16, 207.13, 635, 207.12, 207.22; 92/5 R

(56) References Cited

U.S. PATENT DOCUMENTS 4,874,053 * 10/1989 Kimura et al. ................... 180/44.3
5,233,293 * 8/1993 Huange et al. ................. 324/207.15

FOREIGN PATENT DOCUMENTS

| | | |
|---|---|---|
| 29 33 557 | 2/1981 | (DE) . |
| 32 80 440 | 12/1987 | (DE) . |
| 38 09 803 | 12/1988 | (DE) . |
| 43 09 881 | 5/1994 | (DE) . |
| 0 249 117 | 12/1987 | (EP) . |
| 0 432 434 | 6/1991 | (EP) . |
| 2 207 763 | 2/1989 | (GB) . |
| 60009858 | 1/1985 | (JP) . |
| 07229760 | 8/1995 | (JP) . |
| WO 94/07037 | 3/1994 | (WO) . |

OTHER PUBLICATIONS

Horst Flechtner et al., "Entwicklung eines inkrementalen Winkelgebers", F & M 100 (1992) 4, pp. 137–139.

Reinhard Drews et al., "Entwicklung eines digitalen Lenk-winkelsensors auf Induktivbasis", F & M 101 (1993) 10, pp. 381–384.

E. Houdremont, Handbuch der Sonderstahlkunde [Handbook for Specialized Steel], vol. 2,3$^{rd}$ Edition, Springer Publishing House, 1956, pp. 1327–1331.

* cited by examiner

Primary Examiner—Safet Metjahic
Assistant Examiner—Subhash Zaveri
(74) Attorney, Agent, or Firm—Venable; George H. Spencer; Robert Kinberg

(57) ABSTRACT

A sensor component is provided that includes a coded magnetic transmitter, an associated sensor device, and a shell. The transmitter and the sensor device are movably positioned relative to one another, and the magnetic transmitter is arranged inside the shell. The shell is closed relative to the sensor device and includes austensic steel with more than 0.4 weight percentage nitrogen and a yield strength of at least 900 Mpa.

20 Claims, 4 Drawing Sheets

SENSOR COMPONENT

BACKGROUND OF THE INVENTION

The invention relates to a sensor component with a coded magnetic transmitter and associated sensor device, positioned such that they can be moved relative to each other and wherein the magnetic transmitter is arranged inside a diamagnetic or paramagnetic case that is closed relative to the sensor device.

A known sensor component of this type (German Patent 38 44 578 C2) comprises two magnetic transmitters that are axially coupled via a torsion shaft and, as circular rings, are provided with a magnetic coding in a circumferential direction as scale for the torsion angle. The torsion shaft is part of a steering gear for motor vehicles and, together with other steering parts and drive parts, is positioned rotatably inside a bearing housing. In the radial range of the magnetic transmitter, the gear housing is provided with an opening through which a magnetic-field sensitive sensor, belonging to a sensor component that is flanged onto the outside of the gear housing, extends close to the cylindrical shell surfaces of the magnetic transmitter. This kind of configuration protects the magnetic transmitters against outside influences. However, at least one through opening, as well as a seal between the sensor component and the gear housing must be provided at a predetermined location.

SUMMARY OF THE INVENTION

It is an object of the invention to create a sensor component which permits a simplified design in the region of the coupling section between magnetic transmitter and sensor component.

A sensor of the present invention includes a coded magnetic transmitter and an associated sensor device positioned such that they can be moved relative to each other. The magnetic transmitter is arranged inside a diamagnetic or a paramagnetic case or shell closed relative to the sensor device. The sensor component has a case or shell made of an austenitic steel with more than 0.4 weight percentage nitrogen and has a yield strength between 900 MPa and 2500 MPa.

If a sensor element is designed according to the invention, the magnetic transmitter fits inside a shell that is closed at least relative to the sensor component. This shell tightly encloses the magnetic transmitter in adjustment direction and ensures a reliable protection against mechanical interference with the magnetic transmitter. For the most part, the magnetic field lines emanating from the magnetic transmitter penetrate the shell diamagnetically or paramagnetically. It is preferable if a nitrogen-alloyed steel with high nitrogen content and extreme hardness is used for the shell.

The magnetic transmitter can be produced in the manner of a tube or bar from a permanent magnetic material and can be designed with a magnetic coding extending in longitudinal direction. The magnetic transmitter for this embodiment, for example, can be arranged in a hollow piston rod of a hydraulic power steering actuator, wherein the tube-shaped piston rod has a completely closed jacket surface and the magnetic transmitter is positioned in an actuator housing such that it can be displaced in longitudinal direction. The sensor component can be secured so as to be radial to the piston rod where the piston rod exits from the actuator housing or on an adjacent, locally fixed carrier. The sensor device then detects the information from the magnetic transmitter during the longitudinal displacement of the piston rod.

If the magnetic transmitter is designed in the manner of a circular disc or a circular ring, with the magnetic coding extending in circumferential direction, it can also be arranged inside a hollow steering spindle, wherein the sensor component can be locally fixed on a carrier in which the steering spindle is positioned or on a neighboring carrier. The steering spindle is preferably formed from a magnetically transparent material. It is particularly preferable if the steering spindle is made from an austenite steel with extreme hardness and a high nitrogen content of more than 0.3 weight percentages of nitrogen. However, the magnetic transmitter can also be fixed concentrically on the outer jacket surface of the steering spindle and can be protected with its own shell that is attached to the steering spindle.

The magnetic transmitter, secured inside the shell, and the shell or a structural component supporting the magnetic transmitter and the shell are positioned such that they can move relative to each other. In contrast, the sensor component is positioned such that it is locally fixed. The radial distance between the magnetic transmitter, designed as a scale, and the associated sensor device can vary over a wide range that depends on the pole separation, e.g. between 0 and 15 mm, without a significant weakening of the signals occurring at the sensor component. As a result, the assembly of the sensor component involves little adjustment and integration into the respective mechanical component is possible with low additional volume.

The sensor component can also have several magnetic field-sensitive individual sensors, which are respectively assigned to one magnetic transmitter. For reasons of safety, a parallel operation of several magnetic transmitters is also possible. In addition, the individual magnetic transmitters can be formed from several partial magnetic transmitters, arranged parallel to each other, to which respectively at least one individual sensor is assigned and which carry different magnetic coding, so that not only the relative, but also the absolute torsion angle or longitudinal displacement distance can be derived from the pulse signals that are read out at each partial magnetic transmitter from the mechanical displacement movement. Otherwise, the sensor component can include magnetoresistive sensors, Hall sensors and inductive sensors for acquiring the magnetic fields, for which the magnetic polarization changes via the adjustment distance of the magnetic transmitter.

The use of an austenite steel with extreme hardness and a very high nitrogen content is especially preferred as material for the jacket and/or the raw material for the sensor. It is favorable if the steel does not have magnetic components even when processed mechanically and can thus be processed, particularly deformed, ground and/or polished without additional reworking. This is a particular advantage for highly stressed structural elements, for which the translatory motion and the angular motion must be measured, especially for hydraulic actuating mechanisms, dampers, push-pull rods guided inside bushings and linear drives of any kind.

BRIEF DESCRIPTION OF THE DRAWINGS

In the following, the invention is explained in further detail with the aid of basic diagrams for one exemplary embodiment.

DETAILED DESCRIPTION OF THE INVENTION

Figure 1:
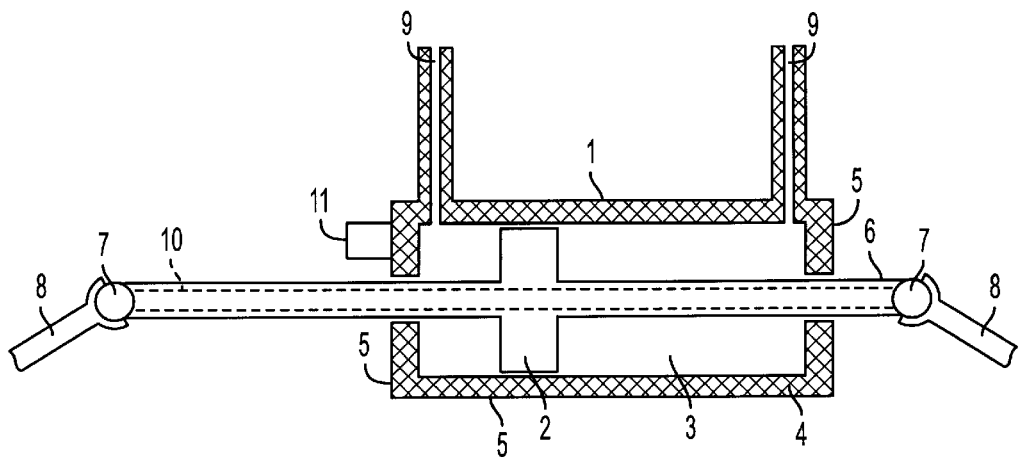
FIG. 1 A linear distance—sensor component on a hydraulic actuating mechanism.

A rectilinearly adjustable hydraulic actuator 1, e.g. as can be used for steering aids in motor vehicles, is provided with a linearly displaceable piston 2 that is positioned axially displaceable in a cylinder chamber 3. The cylinder chamber 3 is axially closed on both sides and is provided with openings in the front walls 4. Respectively one piston rod 6, which is rigidly connected to the piston 2 and arranged in the adjustment direction of said piston, is guided through these openings with a sliding seal 5 fitted in between. Steering joints 7 rest on the two ends of piston rod 6, by way of which respectively one steering rod 8 for influencing the steering angle of non-depicted vehicle wheels is attached such that it is articulated. Hydraulic pressure control lines 9 empty in axial direction before and after the piston 2 into the cylinder chamber 3. These lines are used for a hydraulic control of the longitudinal adjustment of the piston 2 and thus the piston rod 6.

The piston rod 6 is hollow over at least a portion of its length and is provided with a magnetic transmitter 10 in one region, which projects over the adjustment distance of the piston 2 outside of a front wall 4. In the present case, the magnetic transmitter 10 is arranged inside the piston rod 6 and is protected by its jacket or shell without openings. The magnetic transmitter 10 has a magnetic coding across its active length with a plurality of magnetic zones with magnetically opposite polarization arranged side-by-side in a row. In the adjustment range of the magnetic transmitter 10, a sensor device 11 is secured on the neighboring front wall 4, which sensor device is magnetically coupled with the magnetic transmitter 10. In case of a longitudinal adjustment of the piston rod, it detects the number and/or phase of the magnetic pole changes occurring in its acquisition range and feeds a corresponding signal sequence to an evaluation unit. The piston rod 6 in this case consists of non-magnetic, austenite steel, so that the magnetic coupling of the sensor device 11 is transmitted through this jacket at least for the most part without being influenced. An austenite, high-nitrogen content steel is preferably used.

The steel with high nitrogen content is a nitrogen-alloyed steel with a nitrogen content of more than 0.2 weight percentages, preferably more than 0.4 weight percentages nitrogen. It is particularly preferable if the nitrogen content is between 0.4 to 1 weight percentage. The nitrogen-alloyed steel has a high yield strength of more than 900 Mpa, especially up to 2500 MPa. It is preferable if the nitrogen-alloyed steel also contains chromium and manganese. Particular advantages of the nitrogen-alloyed steel are that it is corrosion-resistant, hard and simultaneously non-magnetic and, in particular, can be processed mechanically without forming magnetic martensite constitutents, as is the case with standard austenitic steels. Owing to this, the steel can also be used for structural elements that are highly stressed and/or that must have a high surface quality. With this material, an additional chrome-plating step for coating the surface, especially for obtaining a smooth surface, is not necessary. Rather, the material can be processed directly.

In contrast to standard and in particular austenitic steels, the previously described steel with increased nitrogen has an extremely high nitrogen content and can be produced only with a so-called eletroslag pressure re-melting process. This process permits the production of high-nitrogen steel parts with larger dimensions, particularly those measuring several meters in length and several decimeters in diameter. Examples of such high-nitrogen steels are, for example, CrMn1818 with a nitrogen content of at least 0.4 weight percentages, especially between 0.4 and 1.4 weight percentages, a steel grade 1.3816 with 0.65 weight percentages nitrogen and a steel grade 1.4456 with 0.95 weight percentages nitrogen. Since the steel has a magnetic permeability of $\mu$<1.5, it can be considered to be magnetically transparent. The steel exhibits a high toughness and high yield strength and is corrosion-resistant.

Standard austenitic steels, insofar as they contain nitrogen, can be molded up to a nitrogen content of maximum approximately 0.3 weight percentages. Standard austenitic steels are preferably used only to reinforce magnetic sensors, but cannot be used as shell material around a magnetic transmitter because of the martensite constituents that form during the processing and/or hardening. It is therefore particularly advantageous to have a high-nitrogen austenitic steel with a nitrogen content of at least 0.4 weight percentages for the piston rod 6, since this steel is sufficiently hard, does not form a deformation martensite during the processing, and thus, does not require a thermal reworking to change the martensite to an austenite. The piston rod surface can be ground and polished directly, so that a chrome-plating of the surface of the piston-rod 6 for a coating and hardening of the surface is not necessary.

The use of high-nitrogen, austenitic steel as shell material, in particular for magnetic scales and/or as protective cover for magnetic transmitters, is especially advantageous because of its favorable processing qualities and its hardness and corrosion-resistance. As a result, it is possible to form bumpers, piston rods, hydraulic rods and similarly high-stressed structural elements, especially in connection with magnetic scales for determining the position, which are especially compact and insensitive to environmental conditions. The magnetic transmitter and actuator can be combined, thus permitting an especially space-saving arrangement of such structural elements.

For the protected arrangement of the magnetic transmitter, no additional component and no additional reworking of the outer jacket surface are needed with this embodiment. The tight seal in the sliding seal range is thus ensured, and the sensor component can detect the signal directly at the respective front 4 of the hydraulic actuator 1. The magnetic transmitter 10 in the form of a rod or tube can here consist of a zone-by-zone magnetizable material, which can be secured directly inside the hollow piston rod 6. The sensor component consisting of magnetic transmitter 10 and sensor device 11 is thus integrated into the hydraulic actuator design. The magnetic transmitter 10 in this case can consist of several parallel extending partial magnetic transmitters. Each partial magnetic transmitter in this case is assigned at least one individual sensor, so that the failure of a sensor can be determined for reasons of safety. Several individual sensors in this case can be assigned to a magnetic transmitter or a partial magnetic transmitter to further increase the safety. Corresponding sensor components can also be provided at both fronts 4 of the hydraulic actuator 1.

Another embodiment has the ring-shaped magnetic transmitters arranged concentrically on a rotating shaft that is in particular designed as steering spindle for a motor vehicle. The magnetic transmitters in this case have respectively one magnetic coding, distributed over their jacket surface in circumferential direction, which can be read out by means of the sensor devices, which are locally fixed and positioned radial to the magnetic transmitters. With a shaft made of a non-magnetic steel or another suitable diamagnetic or paramagnetic material, especially an austenite steel with increased nitrogen content, the magnetic transmitters can be arranged such that they are protected in a correspondingly adapted hollow space inside the shaft. Otherwise, it makes sense if an outer non-magnetic shell with adapted diameter, particularly one made of an austenite steel with high nitrogen content is attached to the shaft either individually or jointly for the magnetic transmitters, so as to ensure sufficient mechanical protection. However, if the magnetic transmitters are arranged unprotected on the shaft, an outer non-magnetic tube, in particular made of a nitrogen-alloyed steel with a nitrogen content of at least 0.4 weight percentages nitrogen and a yield strength of more than 900 MPa, can be arranged concentrically thereto and locally fixed, so that the sensor device can be secured directly on this tube. It is also possible to configure each magnetic transmitter from several partial magnetic transmitters, ranged parallel to each other, and to assign at least one individual sensor to each partial magnetic transmitter.

Figure 2:
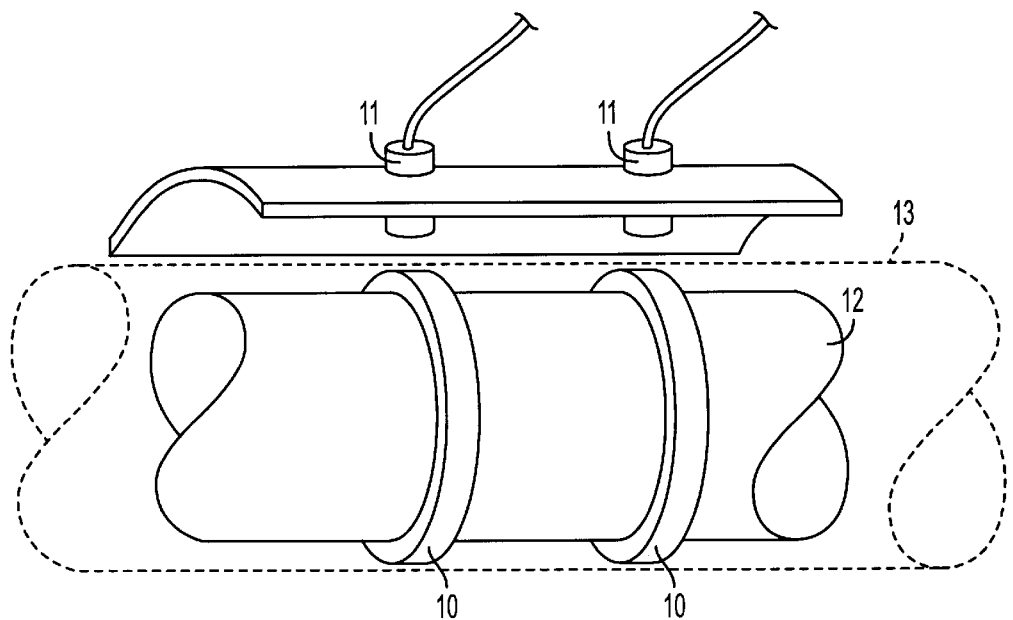
FIG. 2 A rotational angle sensor component that is assigned to a rotating shaft.

FIG. 2 shows the magnetic transmitters 10 arranged on the shaft 12. An outer shell 13 is arranged to protect the magnetic transmitters 10. Sensors 11 are arranged outside of the shell 13.

It is very advantageous if the magnetic transmitter and the component to be monitored form one unit and if the scales and dimensions cannot be seen optically and mechanically from the outside. In particular, applying magnetic markings to the outside of the shell of the shaft 12 or the piston rod 6 is thus avoided which markings weaken the mechanical solidity of the surface and reduce the service life of the highly stressed structural element as possible breakage point and/or corrosion point.

One favorable embodiment of the magnetic transmitter provides for a ferromagnetic layer on the inside of the shell, for which the heat expansion does not differ from that of the shell. The ferromagnetic layer can be coded or can be structured correspondingly and replaces the massive magnetic scale. As a result, an advantageous weight saving is possible.

The magnetic regions for another favorable embodiment of the magnetic transmitter are provided on a rod made of solid material or a rod with through bores, which rod is fixedly connected to the shell, at least in one location, and has a coefficient of expansion that is adapted to the expansion coefficient of the shell. The measurement in that case is not influenced by a differing thermal expansion of magnetic transmitter and sensor device, especially in the case of thermal stress and strong temperature fluctuations.

It is also advantageous to arrange two scales in the shell, each having magnetic ranges with respectively different distances to each other, so that both scales exhibit a different number of periods for determining the absolute position while having the same overall length. It is particularly advantageous if two scales are arranged parallel and one above the other inside the shell, which scales have magnetic ranges with respectively different distances relative to each other, so that the number of periods for each scale differs by one for the same overall length.

Figure 3:
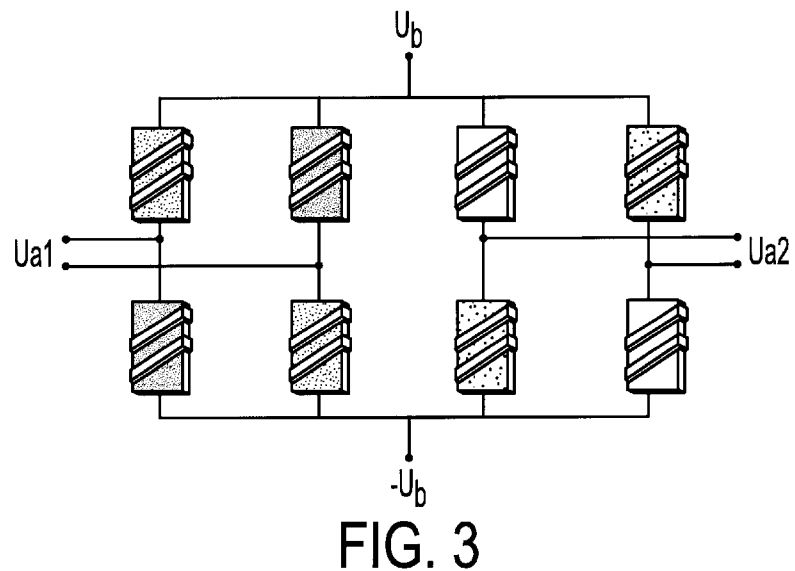
FIG. 3 The basic design of a bridge circuit formed with magnetoresistive sensors.
Figure 4:
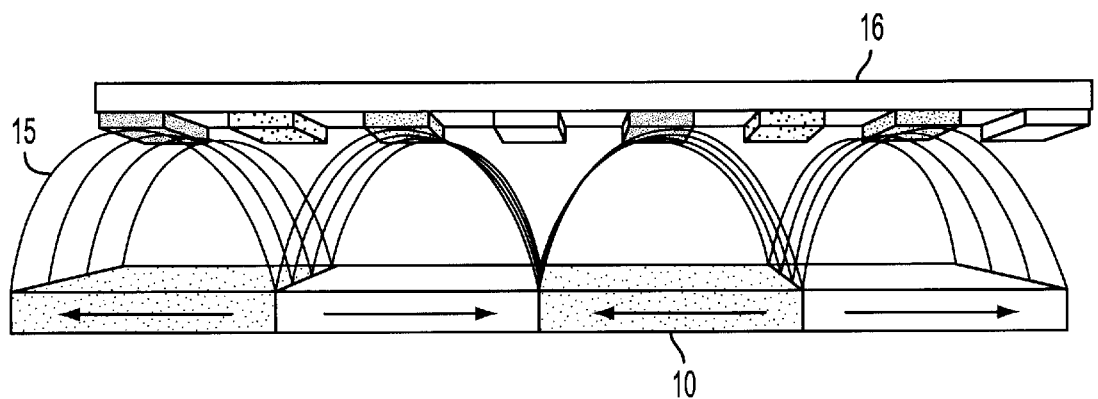
FIG. 4 The sensor position relative to the magnetic field to be measured.
Figure 5:
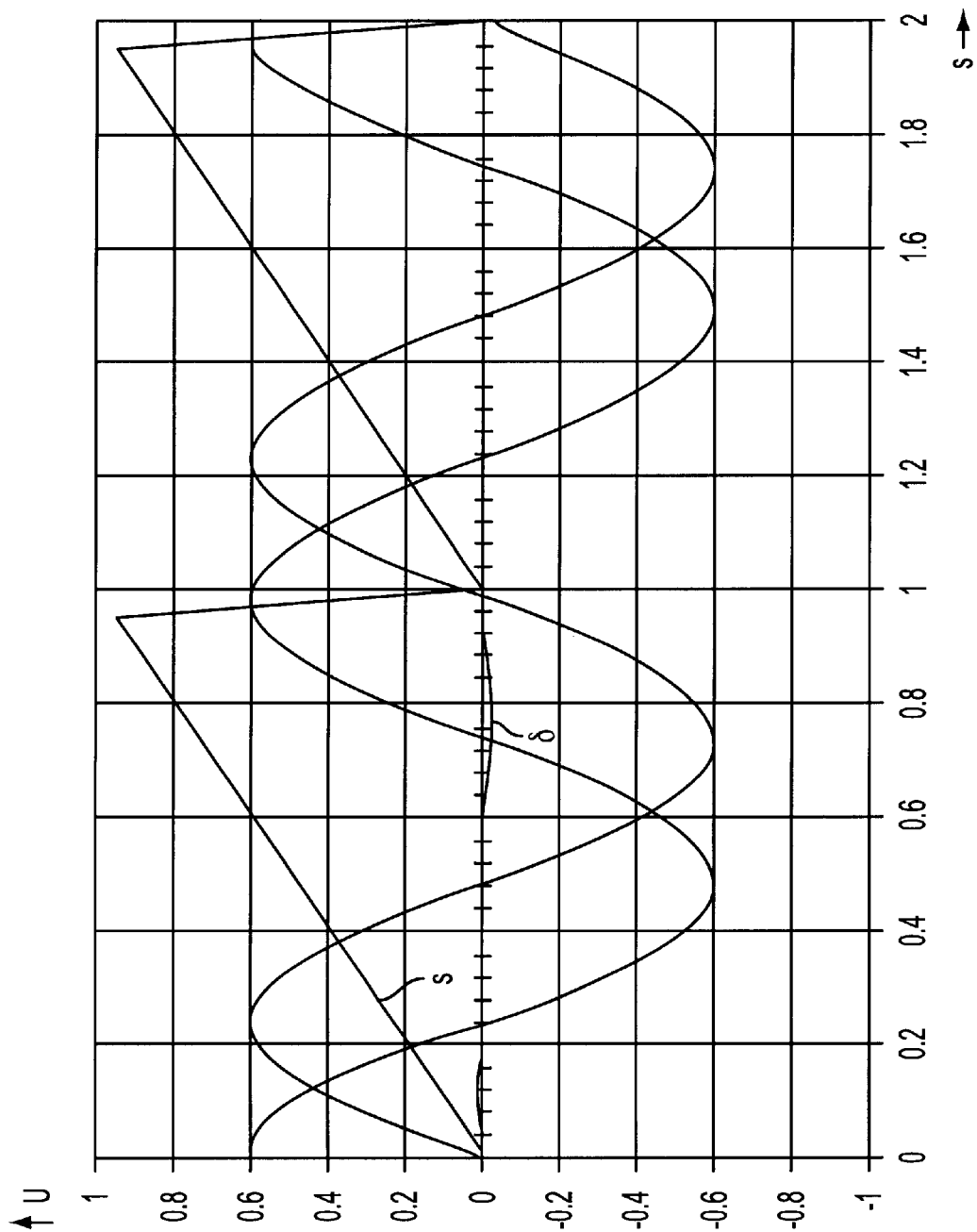
FIG. 5 The signal voltage on a longitudinal sensor in dependence of the measuring distance.

Magnetoresistive sensor chips, e.g. as known from the German Patent 42 37 540 C2, have been developed analog to corresponding optical sensor chips. Such a chip contain is two complete Wheatstone bridges of magnetoresistive sensor strips with barber pole structure. FIG. 3 shows the basic design of a bridge circuit formed with magnetoresistive sensors. The bridge resistances are arranged on the chip in such a way that all barber pole structures face in the same direction and experience the same resistance change in an outer magnetic field. Thus, they do not supply a signal if the bridge is set to zero. The bridges can be actuated with a magnetically coded magnetic transmitter 10. The strips of the first bridge and the strips of the second bridge are respectively displaced by one fourth of the prior length on the scale. The arrangement of the sensor element 16 relative to the detected magnetic fields 15 of scale is shown in FIG. 4. It follows from this that the signals from both bridges are phase-displaced to each other by 90°, meaning a sine and a cosine signal are available for the evaluation and interpolation. FIG. 5 illustrates a corresponding measuring result by showing the measured sine and cosine output voltage (in 0.1 voltage increments), the measuring distances determined from this (in pole lengths) and the deviations δ to the actual measuring distance (m 0.1 pole lengths), provided the sensor is at a distance of 2 mm from the surface of the scale. The magnetoresistive sensors are produced with the microstructure technology known from semiconductor techniques. This ensures the required exact, relative position of the individual sensors on a chip.

In a new development of linear sensors, the sensor chips and the magnetic transmitters are preferably dimensioned such that a signal amplitude, that does not depend on the distance is achieved over a far-reaching distance range. This is possible even though the distance, to the magnetic transmitter results in a rapidly diminishing magnetic field strength. They can be used up to temperatures of 150° C. The optimum distance between sensor element and magnetic transmitter should be somewhat smaller than the scale period of the magnetic transmitter, thus allowing the detection of distances of up to 0.01 mm.

Magnetoresistive sensors have the following advantages. With high field strengths, there is little or no dependence of the signal on the magnetic field strength. Owing to the bridge circuit, there is no signal offset and temperature effects are mostly compensated. The assembly requires little adjustment, and the sensors can easily be integrated into the mechanical components owing to the slight volume. They permit a sufficient measuring speed.

Absolute distance measurements can also be made with a scale with a predetermined change of the magnetic markings on the scale. A known absolute distance measuring system is based on the evaluation of magnetic markings, which are affixed on two scales as magnetic transmitters with respectively different period length. It applies in this case that both scales must have a period number differing by one for the same total length. The number of periods present can be determined from such a dual scale.

Figure 6:
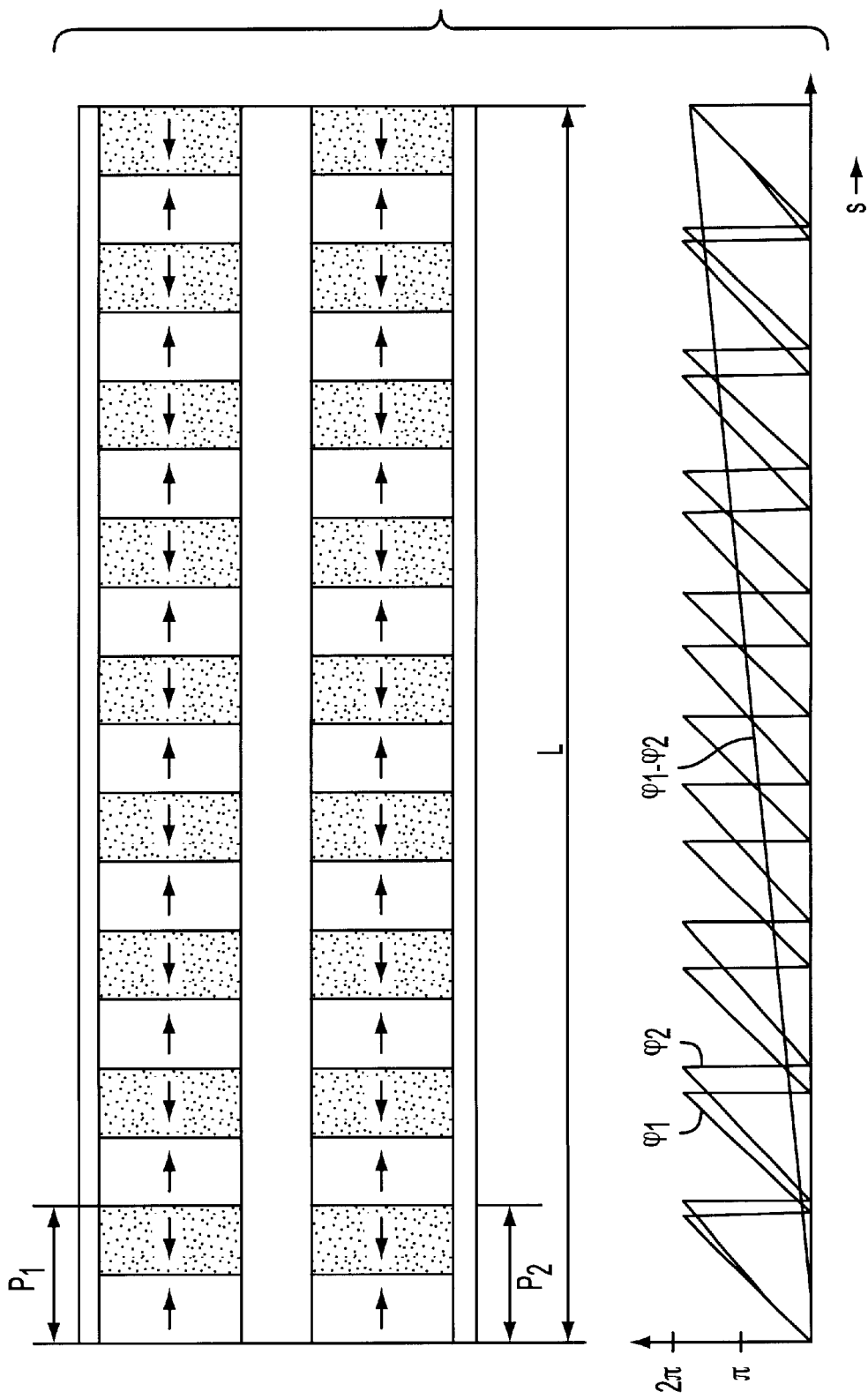
FIG. 6 The principle of the absolute length measurement with two periodic, magnetic tracks with varied phase.

FIG. 6 serves to explain the evaluation procedure. The calculated distance is a sawtooth-shaped curve. The maximum measuring error δ amounts to only fractions of one percent. For a coarse position of the absolute measuring value, the interpolation value for the phase of the last track period present at the corresponding position is also added to increase the accuracy.

In order to read the magnetic scales, Hall effect sensors are similarly suitable as magnetoresistive sensors with respect to the sensitivity. Hall sensors are advantageous because they can be produced cheaply with the aid of the microstructure technique known from the field of semiconductor technology, require little additional volume, can be integrated into the respective mechanical components, and permit a sufficient measuring speed.

However, the Hall sensor signal is dependent on the field strength and thus strongly on the distance. This requires very small tolerances during the assembly. Inductive sensors cannot be produced without problems with the methods known from semiconductor technology because they have relatively large dimensions.

In order to ensure the accuracy and sensitivity of the described sensors when reading the magnetic scales of the sensor component, it is particularly advantageous to use austenite steel with a high nitrogen content since this steel is non-magnetic and does not interfere with the measuring.

Owing to the particularly favorable mechanical characteristics of this steel, especially its high strength and hardness, it is also possible to design the outside wall of a shell with less thickness than is possible with standard austenite steels, so that the distance between magnetic transmitter 10 and sensor 11 can be minimized. An enveloping tube with $R^4$ has a typical wall thickness of 0.25 to 0.33 of the total diameter owing to the dependence of the surface moment of inertia on the radius R. This results in a high weight for such an arrangement. The use of an austenite steel with high nitrogen content, having more than 0.4 weight percentages nitrogen, makes it possible to reduce the wall thickness of a shell for a magnetic transmitter by about 5%, in particular 10%, without reducing the stability of the shell.

In particular with magnetic field strength-dependent sensors for reading the magnetic signals, the signal strength increases disproportionally for a small distance between sensor and magnetic transmitter. The distance can be optimized, particularly with magnetoresistive sensors. An optimum distance is adjusted if the scale period corresponds to the distance between sensor and magnetic transmitter. The minimum possible distance is the wall thickness of the shell.

What is claimed is:

1. A sensor component comprising:
   a coded magnetic transmitter;
   an associated sensor device, the transmitter and the sensor device being movably positioned relative to one another; and
   a shell,
      wherein the magnetic transmitter is arranged inside the shell, and
      wherein the shell is closed relative to the sensor device and includes austensic steel with more than 0.4 weight percentage nitrogen and with a yield strength of at least 900 Mpa.

2. The sensor component according to claim 1, wherein the shell is one of diamagnetic and paramagnetic.

3. The sensor component according to claim 1, wherein the magnetic transmitter comprises a circular ring with magnetic coding extending in a circumferential direction.

4. The sensor component according to claim 1, wherein the magnetic transmitter is ring-shaped and is secured on a rotatably positioned steering spindle.

5. The sensor component according to claim 4, wherein the shell comprises an axially closed, rigidly secured tube, and wherein the steering spindle is arranged inside the tube and the sensor device is locally fixed.

6. The sensor component according to claim 1, wherein the magnetic transmitter is tube-shaped with magnetic coding extending in a longitudinal direction.

7. A sensor component according to claim 1, wherein the magnetic transmitter is designed in the manner of a rod with magnetic coding extending in a longitudinal direction.

8. A sensor component according to claim 1, wherein the magnetic transmitter comprises a circular disk with a magnetic coding extending in a circumferential direction.

9. A sensor component according to claim 1, wherein the magnetic transmitter is secured inside the shell.

10. A sensor component according to claim 1, wherein the shell and the magnetic transmitter are positioned such that they can move relative to each other and the sensor device is arranged such that it is locally fixed relative thereto.

11. A sensor component according to claim 1, wherein the sensor device includes a plurality of magnetic-field sensitive individual sensors respectively assigned to one magnetic transmitter.

12. A sensor component according to claim 1, wherein the magnetic transmitter includes a plurality of partial magnetic transmitters arranged parallel to each other, and wherein a plurality of individual sensors are assigned to each partial magnetic transmitter.

13. A sensor component according to claim 1, wherein the shell comprises a hollow piston rod that can be moved in a longitudinal direction inside a housing for a hydraulic power steering actuator, and wherein the sensor device is secured on the actuator housing, radially to the piston rod.

14. A sensor component according to claim 1, wherein the magnetic transmitter is ring-shaped and is secured in a rotatably positioned steering spindle.

15. A sensor component according to claim 14, wherein the shell comprises an axially closed, rigidly secured tube, and wherein the steering spindle with the magnetic transmitter is arranged inside the axially closed, rigidly secured tube and the sensor device is locally fixed.

16. A sensor component according to claim 1, wherein the shell has a yield strength of between 900 Mpa and 2500 Mpa.

17. A sensor component according to claim 1, wherein the shell has an inside, wherein the magnetic transmitter includes a ferromagnetic layer arranged on the inside of the shell, and wherein the heat expansion of the layer does not differ from the heat expansion for the shell.

18. A sensor component according to claim 1, wherein the transmitter has magnetic regions and wherein the magnetic regions of the magnetic transmitter are arranged on one of a rod made of solid material and a rod with a through bore, which is securely connected to the shell at least at one location and has an expansion coefficient that is adapted to an expansion coefficient of the shell.

19. A sensor component according to claim 1, wherein the magnetic transmitter includes two scales arranged inside the shell, said scales having magnetic regions with respectively different distances relative to each other, so that both scales have a different number of periods for determining an absolute position with a same overall length.

20. A sensor component according to claim 1, wherein the magnetic transmitter includes two scales arranged inside the shell, said scales being arranged parallel to one another such that one scale is above the other scale, and said scales having magnetic regions with a respectively different distance relative to each other, so that the period number for both scales differs by one for a same overall length.

* * * * *